United States Patent [19]
Koshimizu et al.

[11] Patent Number: 5,419,182
[45] Date of Patent: May 30, 1995

[54] PRESSURE DIFFERENCE DETECTOR, A METHOD FOR JUDGING AN ABNORMALITY OF THE DETECTOR, AND A FUEL VAPOR EMISSION PREVENTING EMPLOYING THE DETECTOR

[75] Inventors: Akira Koshimizu; Susumu Nagano, both of Hyogo, Japan

[73] Assignee: Mitsubishi Denki Kabushiki Kaisha, Tokyo, Japan

[21] Appl. No.: 273,950

[22] Filed: Jul. 12, 1994

[30] Foreign Application Priority Data

Feb. 10, 1994 [JP] Japan .................................. 6-016606

[51] Int. Cl.⁶ ............................................. G01M 3/08
[52] U.S. Cl. ............................................. 73/46; 73/707
[58] Field of Search ........... 73/4 R, 40, 46, 49.1–49.3, 73/49.7, 49.8, 118.1, 707, 717–720, 722

[56] References Cited

U.S. PATENT DOCUMENTS

| | | | |
|---|---|---|---|
| 3,533,293 | 10/1970 | Puckett | 73/719 |
| 4,452,069 | 6/1984 | Hattori et al. | 73/707 |
| 4,668,889 | 5/1987 | Adams | 73/707 |
| 5,275,054 | 1/1994 | Park | 73/718 |

FOREIGN PATENT DOCUMENTS 192234 12/1987 Japan .
177733 11/1988 Japan .

*Primary Examiner*—Robert Raevis
*Attorney, Agent, or Firm*—Sughrue, Mion, Zinn, Macpeak and Seas

[57] ABSTRACT

A pressure difference detector for detecting a pressure difference between atmospheric pressure and a fuel system vapor pressure to be measured, includes a pressure dampening member 17a for dampening the flow of atmospheric air between an introducing inlet 11a and a reference pressure chamber 12 to limit the air flow rate to a value smaller than a leakage flow rate between the chamber and a fuel system vapor pressure introducing inlet 11b due to a leaking 0 ring seal. This prevents an erroneous judgment that the fuel system is leaking.

4 Claims, 6 Drawing Sheets

PRESSURE DIFFERENCE DETECTOR, A METHOD FOR JUDGING AN ABNORMALITY OF THE DETECTOR, AND A FUEL VAPOR EMISSION PREVENTING EMPLOYING THE DETECTOR

BACKGROUND OF THE INVENTION (1) Field of the Invention

The present invention relates to a pressure difference detector for inspecting air tightness of a closed container in a pipe line system for an automobile engine, a method for judging an abnormality of the pressure detector, and a fuel/vapor emission preventing apparatus employing the detector.

(2) Description of the Related Art

FIG. 1 is a diagram showing a construction of a conventional fuel/vapor emission preventing apparatus. In the figure, reference numeral 1 is a fuel tank, 2 is a canister for absorbing fuel vapor generated from fuel in the fuel tank 1, and 3 is a communication tube connected between the fuel tank 1 and the canister 2. Reference numeral 4 is a purging pipe connected between the canister 2 and an intake pipe 6 communicated with an engine, 7 is an air valve for opening canister 2 to atmospheric air, 8 is a pressure difference detector having one end for introducing a pressure in the fuel tank 1 and another end open to atmospheric air, and 9 is a cap for sealing the fuel tank 1.

Next, an operation of the apparatus shown in FIG. 1 will be described. In the fuel tank 1, fuel and air are contained. The air part in the fuel tank 1 is communicated with atmospheric air through the canister 2 and through a check valve (not shown) mounted on the cap 9 so that, when the pressure in the fuel tank 1 is lowered, atmospheric air is introduced into the fuel tank 1, and when the pressure is increased, the air in the fuel tank is discharged to the atmosphere. Thus, the pressure in the fuel tank 1 is controlled to protect the fuel tank 1 against an excessive pressure.

Since the fuel generally includes a volatile component, however, the air in the fuel tank 1 includes fuel-vapor gas. Therefore, if the air including the fuel-vapor gas is discharged directly to the atmosphere, it causes contamination. To prevent the contamination of the air, conventionally, when the pressure in the fuel tank 1 is increased, the intake valve 5 is opened to introduce the air containing the fuel-vapor gas into the engine through the communication tube 3, the canister 2, the intake valve 5, and the intake pipe 6.

If, however, the air tightness of the fuel-vapor gas emission preventing apparatus is deteriorated due to the fact that, for example, the cap 9 is not completely closed, or some part of the fuel-vapor gas emission preventing apparatus is damaged, a large amount of fuel-vapor gas is leaked into the atmosphere. To ascertain the air tightness of this apparatus, while a vehicle is being driven, the output signal of the pressure difference detector 8 is monitored under the following pressure detectable conditions, i.e., while the engine is made to be in a high power outputting state and while the intake valve 5 is opened, the air valve 7 is closed to make the inside of the emission preventing apparatus including the fuel tank 1 and the canister 2 at a negative pressure, and then the intake valve 5 is closed to make the apparatus a closed chamber. In general, the pressure difference monitor 8 outputs a signal proportional to the change of the pressure. Therefore, under the condition that the fuel vapor gas emission preventing apparatus is closed, if a rapid change of the pressure is generated, the output of the pressure difference detector 8 is also largely changed. By detecting this large change of the output, leakage of the fuel vapor is detected and the preventing apparatus is judged to be malfunctioning. FIG. 2A shows the output signal of the pressure difference detector 8 when the fuel-vapor gas emission preventing apparatus is under a normal operation without leakage. As can be seen from the figure, the negative pressure is constant in this case. FIG. 2B shows an example of the output signal of the pressure difference detector 8 when there is a leakage in the fuel-vapor gas emission preventing apparatus so that it is abnormal. As can be seen from the figure, the negative pressure changes along with time to converge with the atmospheric pressure.

In the above-described conventional apparatus, there is a problem as follows. That is, when the air tightness between a reference pressure introducing side for introducing the atmospheric air and a measuring pressure introducing side for introducing the internal pressure of the fuel tank 1 becomes insufficient, if the atmospheric air leaks from the reference pressure introducing side to the measuring pressure introducing side, the output signal of the pressure difference detector 8 representing the negative pressure changes along with time as shown in FIG. 2C, even when the fuel-vapor gas emission preventing apparatus itself is quite normal so that there is no leakage in the fuel-vapor gas emission preventing apparatus except for the pressure difference detector 8. If the change of the output signal of the pressure difference detector 8 due to the leakage in the fuel vapor gas emission preventing apparatus shown in FIG. 2B is very similar to the change of the output signal of the pressure difference detector 8 due to the leakage in the pressure difference detector 8 shown in FIG. 2C, a problem arises in that, from the state shown in FIG. 2B and from the state shown in FIG. 2C, it is impossible to judge whether the malfunction resides in the fuel-vapor gas emission preventing apparatus or in the pressure difference detector 8.

SUMMARY OF THE INVENTION

In view of the foregoing, an object of the present invention is to provide a pressure difference detector which can determine a malfunction within the pressure difference detector.

Another object of the present invention is to provide a method for judging an abnormal state of the pressure difference detector.

Still another object of the present invention is to provide a fuel-vapor gas emission preventing apparatus which can judge whether a malfunction resides in the fuel-vapor gas emission preventing apparatus or in the pressure difference detector.

According to the first aspect of the present invention, there is provided, for achieving the above object, a pressure difference detector comprising a pressure dampening member for dampening the flow of reference fluid between a reference pressure introducing inlet and a reference pressure chamber so as to limit the amount of the reference fluid flowing between the reference pressure introducing inlet and the reference pressure chamber to be smaller than the leakage amount of fluid between the reference pressure chamber and a measuring pressure introducing inlet.

According to the second aspect of the present invention, there is provided a method for judging an abnormal state of the above-mentioned pressure difference detector, wherein the method comprises the steps of introducing the reference pressure into the reference pressure introducing inlet and introducing a first pressure to be measured into the measuring pressure introducing inlet to detect a first pressure difference between the reference pressure in the reference pressure chamber and the pressure to be measured, introducing a second pressure, different from the first pressure, to be measured into the measuring pressure introducing inlet to detect a second pressure difference between the reference pressure in the reference pressure chamber and the pressure to be measured, comparing the first pressure difference and the second pressure difference, and judging that the pressure difference detector is abnormal when the first pressure difference is the same as the second pressure difference.

According to the third aspect of the present invention, there is provided a fuel-vapor gas emission preventing apparatus employing the pressure difference detector of the first aspect, comprising a canister connected through a communication pipe to a fuel tank, an intake pipe communicated to an engine and connected through an intake valve to the canister, an air valve connected to the canister, and the pressure difference detector of the first aspect, wherein the reference pressure is an atmospheric pressure, and the pressure to be measured is an inner pressure of a system consisting of the canister, the communication pipe, and the intake pipe.

As stated above, according to the first and the second aspects of the present invention, the reference pressure is introduced to the reference pressure introducing inlet, and a pressure to be measured which is different from the reference pressure is introduced to the measuring pressure introducing inlet. When the pressure difference detector detects a positive pressure difference between the pressure to be measured and the reference pressure, i.e., if (the pressure to be measured)>(the reference pressure), or is a negative pressure difference, i.e., (the pressure to be measured)<(the reference pressure), the pressure difference detector outputs a value corresponding to the positive pressure difference or the negative pressure as long as there is no leakage between the reference pressure chamber and the measuring pressure introducing inlet. If there is a leakage between the reference pressure chamber and the measuring pressure introducing inlet, however, when the introduced pressure is higher than the reference pressure, the introduced fluid to be measured instantaneously flows from the measuring pressure introducing inlet to the reference chamber. Since the pressure dampening member is provided, however, for dampening the amount of the reference fluid flowing between the reference pressure introducing inlet and the reference pressure chamber to be smaller than the leakage amount of fluid, the reference fluid in the reference chamber scarcely flow through the reference pressure introducing inlet so that the pressure in the reference pressure chamber becomes the same as the pressure to be measured, and the pressure difference detector outputs a constant value as if there is no pressure difference. Also, if there is a leakage between the reference pressure chamber and the measuring pressure introducing inlet, and when the introduced pressure is lower than the reference pressure, the reference fluid instantaneously flows from the reference chamber to the measuring pressure introducing inlet. Since the pressure dampening member is provided, however, the reference fluid scarcely flows through the reference pressure introducing inlet into the reference chamber so that the pressure in the reference pressure chamber becomes the same as the pressure to be measured, and the pressure difference detector outputs a constant value as if there is no pressure difference. Accordingly, under the condition when the reference pressure is introduced to the reference pressure introducing inlet, and a pressure to be measured which is different from the reference pressure is introduced to the measuring pressure introducing inlet, when the output of the pressure difference detector is constant which is equivalent to there being pressure difference, the pressure difference detector is judged to be abnormal, and when the output of the pressure difference detector outputs a value corresponding to the positive pressure difference or a negative pressure difference, the pressure difference detector is judged to be normal.

According to the third aspect of the present invention, in the fuel-vapor gas emission preventing apparatus, both of the intake valve and the air valve are at first opened, then after closing the intake valve, the air valve is closed. Thereby, the inner pressure of the system including the canister and the pipes is made to be nearly equal to the atmospheric pressure. At this time, the output of the pressure difference detector is read. Then, the intake valve is opened. After that, the output of the pressure difference detector is read. When these two output values of the pressure difference detector are different to each other, the pressure difference detector is judged to be normal, and when they are the same to each other, the detector is judged to be abnormal. When the pressure difference detector is judged to be normal, in the next step, a malfunction test such as a leakage in the fuel-vapor gas emission preventing apparatus itself is carried out.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

Embodiment 1.

Figure 1:
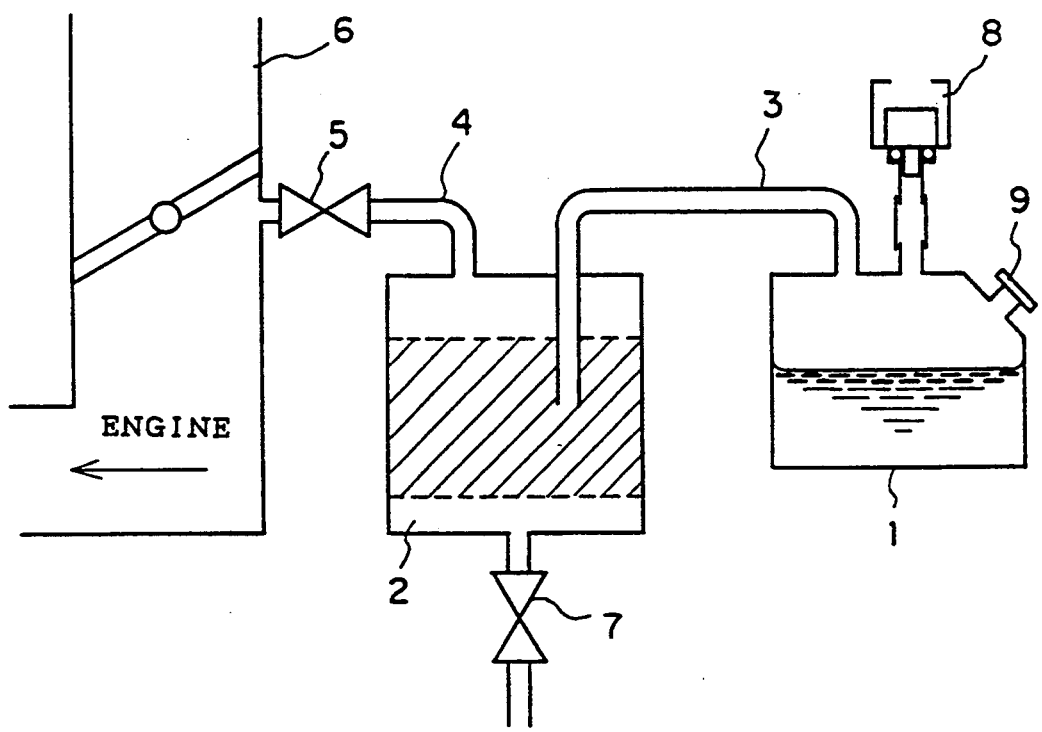
FIG. 1 is a diagram showing the construction of a conventional fuel-vapor gas emission preventing apparatus.
Figure 2A:
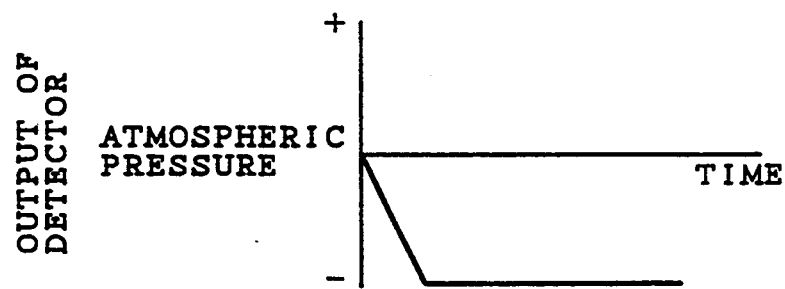
FIG. 2A to FIG. 2C are graph diagrams showing the outputs of a conventional pressure difference detector when it is normal and when it is abnormal.
Figure 2B:
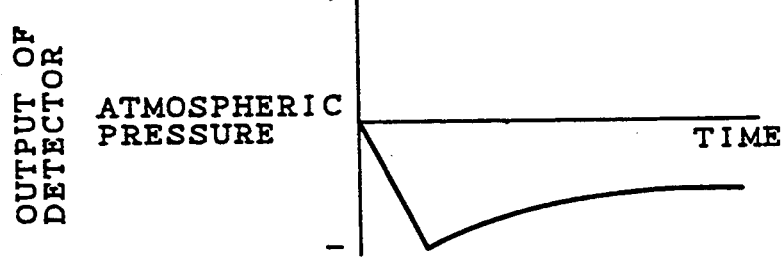
Figure 2C:
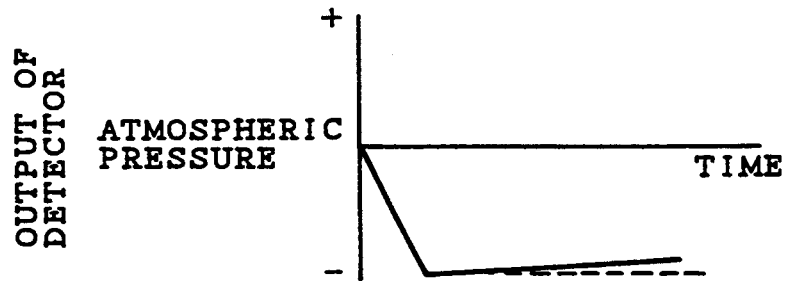
Figure 3:
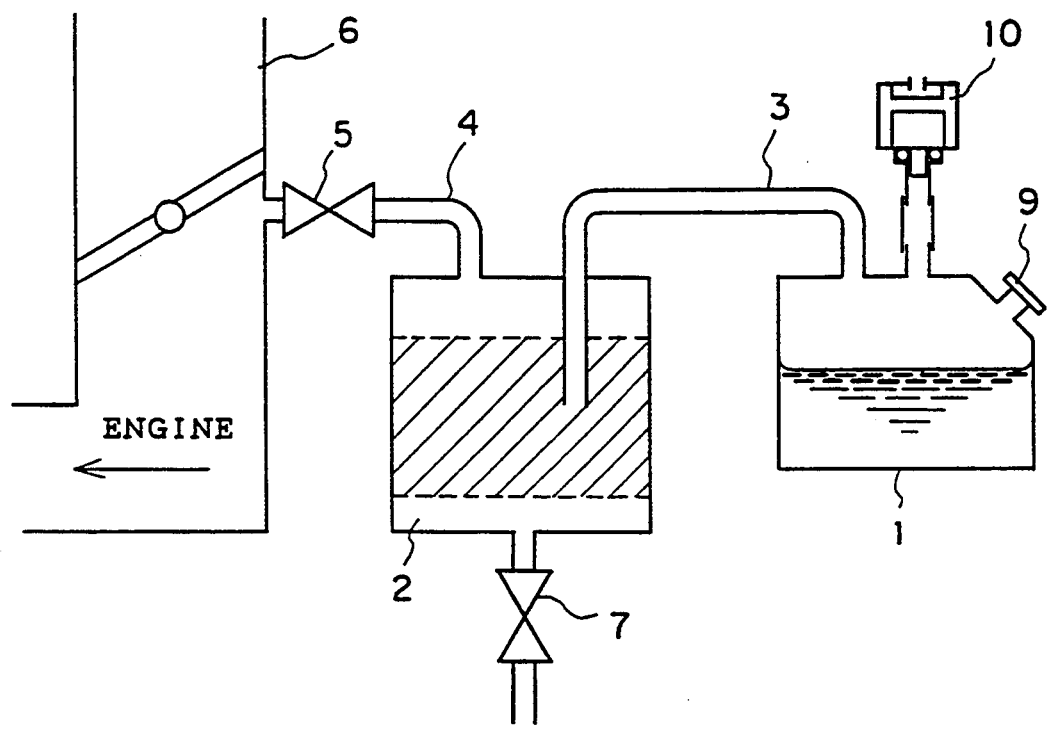
FIG. 3 is a diagram showing the construction of a fuel-vapor gas emission preventing apparatus according to an embodiment of the present invention.

In the following, an embodiment of the present invention will be described with reference to the drawings. FIG. 3 is a diagram showing the construction of a fuel-vapor gas emission preventing apparatus according to an embodiment of the present invention. In FIG. 3, the same parts as those in FIG. 1 are denoted by the same reference numerals, and the description thereof are omitted for the sake of simplicity. Reference numeral 10 is a pressure difference detector for detecting a pressure difference between a reference pressure which is an atmospheric pressure and a pressure to be measured which is an inner pressure of a system consisting of the fuel tank 1, the canister 2, and the communication pipe 3. In the following description, the pressure to be measured is also referred to as a measuring pressure.

Figure 4:
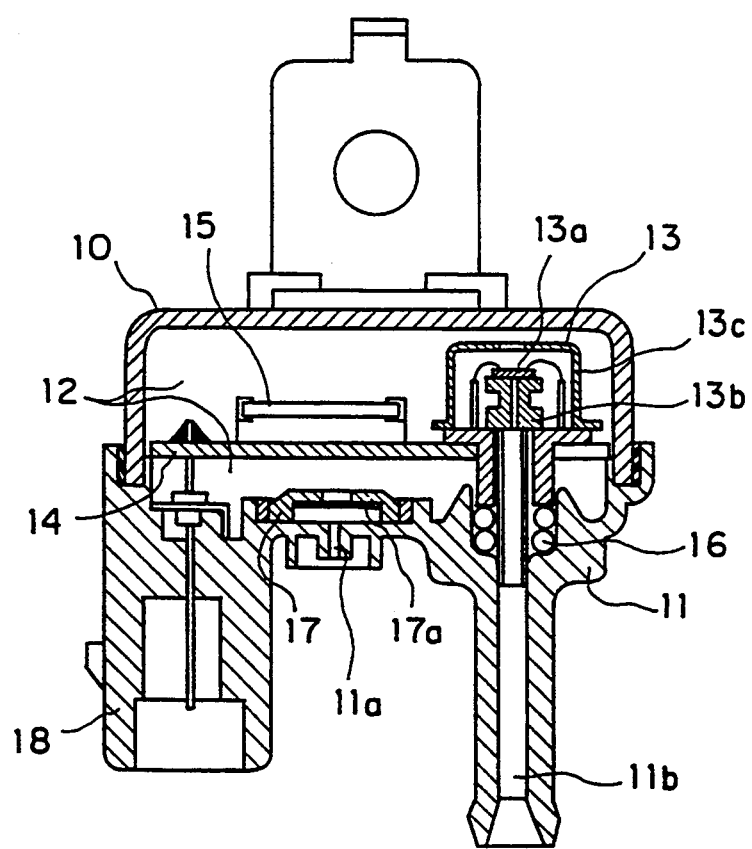
FIG. 4 is a diagram showing in detail the construction of the pressure difference detector in the apparatus shown in FIG. 3.

FIG. 4 is a diagram showing in detail the construction of the above-mentioned pressure difference detector 10. In the figure, reference numeral 11 is a plastic housing, 11a is a reference pressure introducing inlet for introducing an atmospheric pressure as a reference pressure from the external environment of the plastic housing 11, and 11b is a measuring pressure introducing inlet for similarly introducing a measuring pressure external to the plastic housing 11. Reference numeral 12 is a reference pressure chamber for holding the atmospheric pressure introduced from the reference pressure introducing inlet 11a, 13 is a pressure difference detecting element for detecting the pressure difference between the pressure in the reference pressure chamber 12 and the measuring pressure introduced from the measuring pressure introducing inlet 11b. The pressure difference detecting element 13 is constructed by a strain gage 13a, a pedestal 13b provided to improve the temperature characteristic of the strain gage 13a, and a protection cover 13c. In this connection, the pressure difference detecting element 13 and a thick film circuit substrate 15 are assembled on a circuit board 14.

Reference numeral 16 is an O ring(s) for sealing to prevent a leakage between the reference pressure introduced from the reference pressure introducing inlet 11a and the measuring pressure introduced from the measuring pressure introducing inlet 11b. If the sealing by the O ring becomes weakened due to aging or the like, a leakage will occur between the reference pressure and the measuring pressure. It should be noted, other than the O ring, any sealing means which can prevent a leakage between the reference pressure and the measuring pressure may be employed. Reference numeral 17 is a plastic plate with a porous film (pressure dampener member) 17a which is welded by heat in the reference pressure introducing inlet 11a. The porous film 17a dampens or limits the rate of atmospheric air flow between the reference pressure introducing inlet 11a and the reference pressure chamber 12 to a "bleed" valve smaller than the rate of any leakage flow between the reference pressure chamber 12 and the measuring pressure introducing inlet 11b due to a weakened O ring seal. The holes in the porous film 17a are so small that water cannot pass therethrough, but gas can pass through. Therefore, the holes are sufficient to introduce the reference pressure, but such pressure is not outputted or inputted rapidly through the introducing inlet 11a. Reference numeral 18 is a connector through which the pressure difference detecting signal from the circuit board 14 is outputted to the out side.

Next, the operation of the pressure difference detector 10 shown in FIG. 4 will be described. An atmospheric pressure is introduced through the reference pressure introducing inlet 11a, and a measuring pressure is introduced through the measuring pressure introducing inlet 11b. The atmospheric pressure passes through the porous film 17a and is held in the reference pressure chamber 12. The pressure difference detecting element 13 detects the pressure difference between the atmospheric pressure held in the reference pressure chamber 12 and the measuring pressure introduced through the inlet 11b. The detected pressure difference is sent through the circuit board 14 and the connector 18 to an external computer unit (not shown) to be used for display and control.

Figure 5:
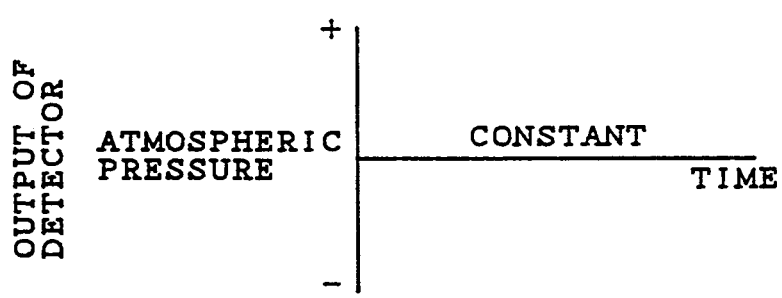
FIG. 5 is a graph diagram showing the output of the pressure difference detector shown in FIG. 4.

In the above construction, when the seal between the reference pressure and the measuring pressure is not good due to a thermal distortion of the O ring 16 or a defective insertion thereof so that the introduced pressure is a positive pressure such as (measuring pressure)>(reference pressure), the fluid to be measured instantaneously flows into the reference pressure chamber 12 from the measuring pressure introducing inlet 11b. If the porous film 17a is not provided as in the conventional art, the fluid to be measured in the reference pressure chamber 12 further passes through the reference, pressure introducing inlet 11a to be discharged to the atmosphere. Since the volume of the atmospheres is infinite in comparison with the volume (1 cm$^3$ to 60 cm$^3$) of the reference pressure chamber 12, the pressure in the reference pressure chamber 12 does not substantially change. Accordingly, the output of the conventional pressure difference detector 8 is a value slightly smaller than the actual pressure difference. By contrast, according to the embodiment of the present invention, since the porous film 17a is provided, the flow of any fluid to be measured which has linked into the reference pressure chamber 12 is dampened by the porous film 17a so that it is scarcely discharged to the external atmosphere. Therefore, the pressure in the reference pressure chamber 12 instantaneously becomes the same as the measuring pressure at the measuring pressure introducing inlet 11b. Accordingly, when the seal between the reference pressure and the measuring pressure is not good and when the introduced pressure is a positive pressure, the output of the pressure difference detector is constant as shown in FIG. 5 which represents that there is no pressure difference.

On the other hand, when the seal between the reference pressure and the pressure to be measured leaks, and when the introduced pressure is a negative pressure, the atmospheric air instantaneously flows from the reference pressure chamber 12 into the measuring pressure introducing inlet 11b. Once again, if the porous film is not provided as in the conventional art, an infinite amount of atmospheric air can be supplied to the reference pressure chamber 12 so that the pressure therein does not significantly change. Accordingly, the output of the conventional pressure difference detector 8 is a value slightly smaller than the actual pressure difference. By contrast, according to the present invention, since the porous film 17a is provided, the flow of the atmospheric air is dampened so that it is hardly supplied to the reference pressure chamber 12. Therefore, the pressure in the chamber 12 instantaneously becomes the same as the measuring pressure at the inlet 11b. Accordingly, the output of the pressure difference detector is constant as shown in FIG. 5, which represents that there is no pressure difference.

Thus, regardless of whether the introduced pressure is a positive pressure or a negative pressure, when the pressure difference detector 10 outputs a value corresponding to the magnitude of the positive pressure or the negative pressure, the pressure difference detector 10 can be judged to be normal, and when it outputs a constant value representing that there is no pressure difference, the detector 10 can be judged to be abnormal because the seal between the reference pressure and the measuring pressure is not good.

Figure 6:
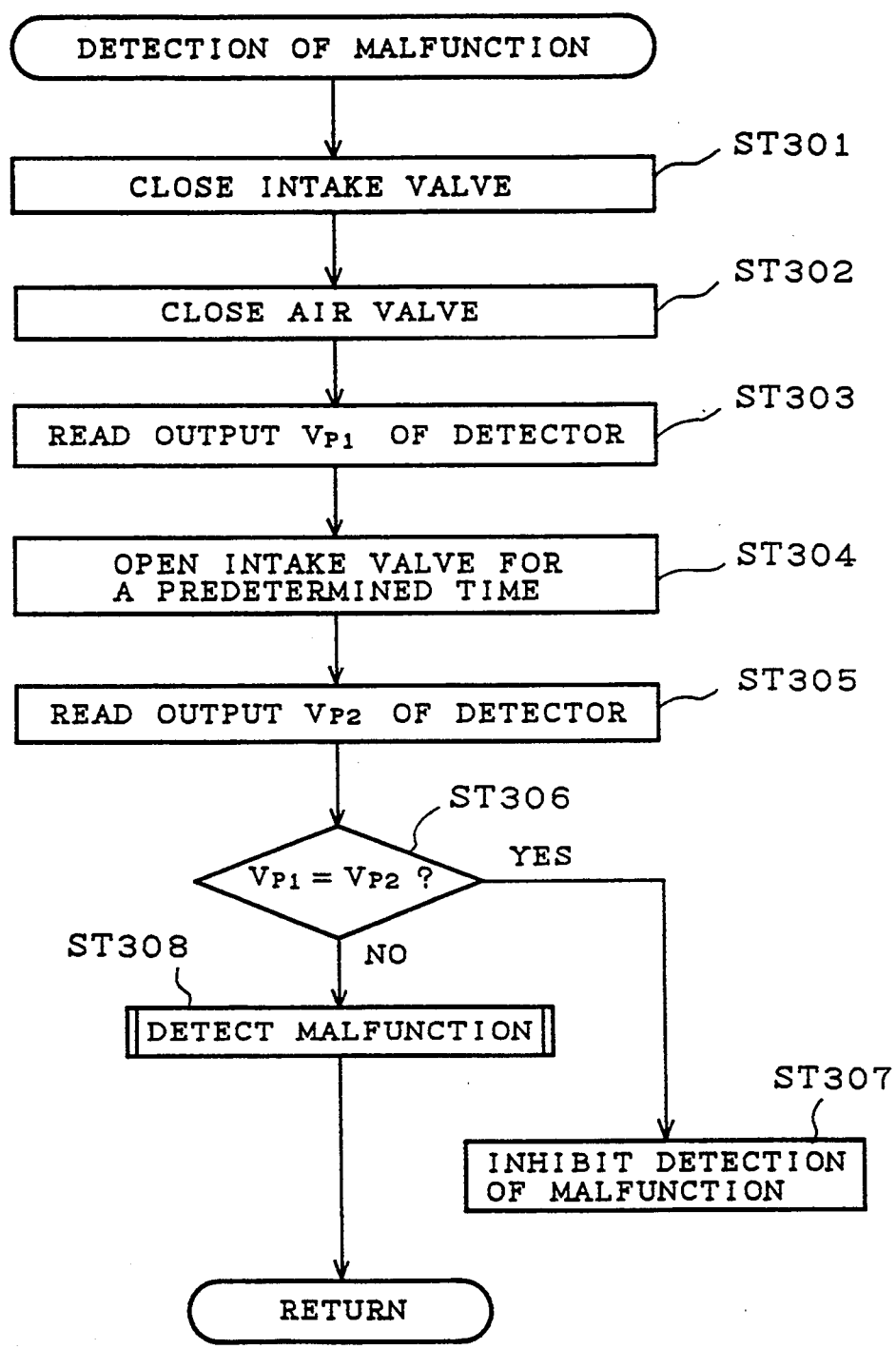
FIG. 6 is a flow chart explaining the operation of the fuel-vapor gas emission preventing apparatus according to an embodiment of the present invention.

Next, the operation of the fuel-vapor gas emission preventing apparatus employing the pressure difference detector 10 will be described with reference to a flow chart shown in FIG. 6. First, the intake valve 5 is closed (step ST301). Then, the air valve 7 is closed (step ST302). By these operations, the system including the fuel tank 1, the canister 2, and the communication pipe 3 is closed so that the internal pressure of the system becomes nearly equal to the atmospheric pressure. In this state, the output (the first pressure) Vp1 of the pressure difference detector 10 is read (step ST303). In the pressure difference detector 10, the atmospheric pressure is the reference pressure, and the above-mentioned internal pressure is the measuring pressure. Therefore, in this state, the output of the detector 10 is constant representing that there is no pressure difference.

Then, the intake valve 5 is opened for a predetermined time period (step ST304). After this, the output (the second pressure) Vp2 of the pressure difference detector 10 is read (step ST305). In this state, the air including the vapor gas in the above-mentioned system is introduced into the engine through the intake valve 5 and the intake pipe 6 so that the internal pressure of the system is lowered. Further, the output Vp1 of the pressure difference detector 10 read at step ST303 and the output Vp2 read at step ST305 are compared (step ST306). When the output Vp1 is equal to the output Vp2, the pressure difference detector 10 is judged to be abnormal because, although the internal pressure of the system has been lowered, the output of the pressure difference detector 10 is not changed. In this case, the detection of a malfunction of the fuel-vapor gas emission preventing apparatus is inhibited (step ST307). On the other hand, when the output Vp1 is not equal to the output Vp2, the output of the pressure difference detector 10 is considered to be changed in accordance with the lowering of the inner pressure of the system so that the pressure difference detector 10 is judged to be normal. In this case, the detection of a malfunction of the fuel-vapor gas emission preventing apparatus is carried out (step ST308).

It should be noted that, in the above-mentioned step ST304, there may be a problem in that, when the intake valve 5 is opened to lower the internal pressure of the system, if there is a leakage in the system so that the internal pressure is not lowered so much, the output Vp1 remains equal to the output Vp2 even though the pressure difference detector 10 is normal. Since the output of the pressure difference detector 10 largely depends on the leakage in the detector 10 itself, however, rather than on the leakage in the system, the pressure in the system does not become equal to the atmospheric pressure as long as there is no large hole in the system. Therefore, there is no possibility to erroneously detect a malfunction of the pressure difference detector 10.

Thus, by employing the pressure difference detector 10 provided with the porous film 17a in the fuel-vapor gas emission preventing apparatus, the malfunction of the pressure difference detector 10 can be detected before detecting a malfunction of the fuel-vapor gas emission preventing apparatus so that the detection of a malfunction of the fuel-vapor gas emission preventing apparatus can be carried out at a high reliability.

In the above-described embodiment, as a pressure dampening member, the porous film 17a is employed, however, in place of the porous film 17a, a plate with a number of small holes which cannot pass water but can pass gas, for example, may be employed.

What is claimed is:

1. A pressure difference detector for detecting a pressure difference between atmospheric pressure and a fuel vapor pressure, comprising:
   a) housing means defining an atmospheric pressure chamber (12) for holding atmospheric pressure, an atmospheric pressure introducing inlet (11a) for communicating the chamber with the external atmosphere, and a fuel vapor pressure introducing inlet (11b) adapted to be connected to a fuel supply system
   b) a pressure difference detecting element (13) disposed within the housing and having one side in open communication with the chamber and another, opposite side in open communication with the fuel vapor pressure introducing inlet, for detecting a pressure difference between the atmospheric pressure in the chamber and said pressure to be measured;
   c) sealing means (16) for establishing a pressure seal between the chamber and the fuel vapor pressure introducing inlet; and
   d) means for preventing an erroneous judgment that the fuel supply system is leaking when instead the sealing means is faulty, said preventing means comprising a dampening member (17a) disposed between the chamber and the atmospheric pressure introducing inlet for dampening the flow rate of atmospheric air between the atmospheric pressure introducing inlet and the chamber to a level smaller than a leakage flow rate between the chamber and the fuel vapor pressure introducing inlet due to faulty sealing means.

2. A pressure difference detector as claimed in claim 1, wherein said dampening member is a porous film having holes which are too small to pass water through them but sufficiently large to pass gas.

3. A pressure difference detector as claimed in claim 1, wherein said dampening member is a plate having a number of small holes which are too small to pass water through them but sufficiently large to pass gas.

4. A method for judging an abnormality of a pressure difference detector, said pressure difference detector comprising:
   a reference pressure chamber for holding under pressure a first, reference gas introduced from a reference pressure introducing inlet defined by the chamber;
   means defining a measuring pressure introducing inlet for introducing a second gas having a pressure to be measured and different from said reference gas;
   a pressure difference detecting element for detecting a pressure difference between said reference pressure in said reference pressure chamber and said pressure to be measured; and a dampening member for dampening the flow rate of the reference gas between said reference pressure introducing inlet and said reference pressure chamber to a level smaller than a leakage flow rate between said reference pressure chamber and said measuring pressure introducing inlet, wherein the method comprises the steps of:

introducing the reference pressure into said reference pressure introducing inlet and introducing a first pressure to be measured into the measuring pressure introducing inlet to detect a first pressure difference between said reference pressure in said reference pressure chamber and said first pressure to be measured;

introducing a second pressure to be measured, different from said first pressure to be measured, into said measuring pressure introducing inlet to detect a second pressure difference between said reference pressure in said reference pressure chamber and said second pressure to be measured;

comparing said first pressure difference and said second pressure difference; and judging that said pressure difference detector is abnormal when said first pressure difference is substantially the same as said second pressure difference.

* * * * *